US005188880A

United States Patent [19]

Tether

[11] Patent Number: 5,188,880

[45] Date of Patent: Feb. 23, 1993

[54] VOID FILL MATERIAL

[76] Inventor: Russell W. Tether, 18625 Midway Rd., #1502, Dallas, Tex. 75287

[21] Appl. No.: 804,995

[22] Filed: Dec. 11, 1991

[51] Int. Cl.[5] ........................ B32B 3/08; B65D 81/02; B65D 81/12

[52] U.S. Cl. .................................... 428/120; 428/119; 428/2; 428/402; 428/182; 206/584; 206/814; 493/967; D9/456

[58] Field of Search .................... 428/402, 2, 119, 120, 428/182; 206/584, 814; 493/967; D9/456

[56] References Cited

U.S. PATENT DOCUMENTS

| | | | |
|---|---|---|---|
| 3,074,543 | 1/1963 | Stanley | 206/46 |
| 3,188,264 | 6/1965 | Holden | 428/33 |
| 3,559,866 | 2/1971 | Olson, Sr. | 229/14 |
| 3,894,632 | 7/1975 | Sieffert | 204/424 |
| 3,951,730 | 4/1976 | Wennberg et al. | 428/116 |
| 4,120,443 | 10/1978 | Gardner et al. | 229/42 |
| 4,169,179 | 9/1979 | Bussey, Jr. | 428/159 |
| 4,514,453 | 4/1985 | Bussey, Jr. | 428/159 |
| 4,621,022 | 11/1986 | Kohaut et al. | 428/397 |

*Primary Examiner*—Alexander S. Thomas
*Attorney, Agent, or Firm*—Hubbard, Thurman, Tucker & Harris

[57] ABSTRACT

A void fill material (10) can be formed from ordinary scrap cardboard into an interlocking packaging material. Each piece of the material (10) has a primary section (20) defining a primary plane. In a preferred embodiment, a first, second and third finger (22, 24, 26) extend from the primary section (20). The primary section (20) and each finger (22, 24, 26) have a length to width ratio between 3:1 and 1:1. The first finger (22) extends from one side of primary section (20) while the second and third fingers (24, 26) extend from its other side. The intersection (30, 32, 34) between each finger (22, 24, 26) and the primary section (20) is scored, thus allowing the fingers to be bent away from the primary plane. The cushioning benefit of the void fill material (10) is improved by the ability of the deformed fingers (22, 24, 26) to interlock with the fingers of the other void fill material pieces.

13 Claims, 2 Drawing Sheets

VOID FILL MATERIAL

TECHNICAL FIELD OF THE INVENTION

The present invention relates to void fill material for use in packaging. In particular, the present void fill material is made by recycling corrugated cardboard and the like and is designed to interlock with adjacent void-fill material.

BACKGROUND OF THE INVENTION

Today's environmental emphasis is changing the way many companies and consumers do business. It is no longer acceptable to just provide quality.products at the lowest cost. Today's users are requiring companies to consider the long term effects of products and their manufacture. From aerosols to diapers to packaging, products must not be a detriment to the environment.

There are many void fill materials on the market today. These products are made from expanded polystyrene, shredded wood, corn starch, shredded paper, and popcorn. For example, shredded wood, known as "excelsior", is used a great deal in overseas shipping. It provides reasonable protection, but is expensive and is not as effective as other fill material for small and delicate products. It also requires hand packing, since it will not "flow" through any void fill machinery. Hand packing has been known to cause a condition known as Carpal Tunnel Syndrome and, therefore, the increased incidence of worker's compensation.

Shredded paper was once in common use. However, the paper settles and, therefore, does not provide the cushioning most users require. It does not flow and is also very messy. If the source of the paper is newspaper, the ink comes off on the product and the packer's hands. The paper cannot be easily handled. Reaching into the container and packing it by hand is required, also potentially leading to Carpal Tunnel Syndrome. Shredded paper also attracts paper mites.

"Ecopak®" is a new product on the market made of 95% corn starch with other chemicals making up the other 5%. This product costs about $0.75 per cubic foot with a target price of $0.55 per cubic foot. This is double the cost of current void fills. In humid or wet conditions, the product will disintegrate, leaving a residue on the product and degrading its ability to cushion. It is biodegradable, but not recycled.

Popcorn showed promise as a void fill material, but has now been banned by the F.D.A. for us in packing because people might eat it. Popcorn also attracts insects because it is a food source containing natural oils. These oils can also rub off on the packaged product.

Polystyrene "peanuts" are the most common form of void fill packing material. They come in many forms: "S", "J", "W", "C" and a concave disk shape. All "peanuts" have a petrochemical base. Most use Chlorofluorocarbons (CFC's) in production. CFC's are considered to contribute to the deterioration of the ozone layer of the earth's atmosphere. Polystyrene is also a danger to the environment because it does not decompose. Sold to converters as a bead, the polystyrene is heated and expanded to the desired shape. It offers protection to the products packaged. However, "peanuts" tend to settle, allowing the product to shift to an unprotected position within the box. The letter-shaped peanuts offer more cushioning than do the disk-shaped ones. The disk flattens with little pressure. Once flattened, the disk-shaped peanut offers only the cushioning of its thickness (approximately 1/32 inch). Polystyrene costs range from $0.25 to $0.35 per cubic foot. One advantage is that it can be stored in hoppers mounted to the inside roof of a building and over the packing stations. The peanuts are blown into hoppers using a blower and a long tube. The packers then simply open a scissors-like valve to allow the peanuts to flow into the box, thereby surrounding the product.

Last "Quadrapak®" is a new product on the market that is made of recycled corrugated cardboard. The material is shredded and then fan folded into strips. Its promise is limited because it does not flow through existing equipment, weighs the same as shredded paper, and costs as much as polystyrene void fill.

A need exists for a packing material that is effective and cost efficient. This packing material must be environmentally friendly. Namely, the material should be biodegradable, recyclable, recycled and reusable. Moreover, the packing material should be easily produced on-site with relatively inexpensive source material.

SUMMARY OF THE INVENTION

The present void fill system, also known as Corropak, replaces all other void fill materials. Corropak accomplishes this by shaping ordinary scrap cardboard, chipboard, corrugated board, or other suitable materials, collectively called either "corrugated materials" or "corrugated board" into a novel and nonobvious configuration. This useful configuration allows the Corropak to interlock with surrounding Corropak void fill material. The material is typically shaped like the uprights in football or a block "Y" design. Thus, the void fill material is designed to effectively interlock with adjacent pieces of void fill material for increased cushioning.

Unlike polystyrene void fill, Corropak is environmentally safe. Corropak is produced from corrugated material, a blend of paper and starch. Corropak recycles discarded corrugated material into a new product that can be reused multiple times. When the void fill is worn out, it is collected and made into new containerboard. Moreover, Corropak does not carry the static charge that styrofoam peanuts carry.

Corropak is usually produced from surplus corrugated board. The board test is typically #150, #175, #200, #275, or #350. Wall thickness can be singlewall or doublewall. The board fluting can be A, B, C, E, or Asian board. The design of Corropak void fill promotes the interlocking of the Corropak pieces to reduce settling of the package contents and to increase cushioning properties. Each "finger" of the void fill can be scored to more easily bend. This design absorbs more space per piece and provides additional impact protection. Further, because Corropak can be made from fluted corrugated board, it provides a minimum of cushioning at least as thick as the corrugated board. This provides added protection to the products packed in it. Corropak will also help increase the amount of chipboard that is recycled for the same reasons.

Corropak should help reduce the number of trees necessary to make corrugated board by increasing the demand for used corrugated boxes. American container manufacturers are building more efficient recycling plants. However, only 50% of corrugated board is recaptured and only 21% is recycled. Corropak will make more companies and individuals aware of saving boxes.

Also, many more companies and retail outlets will have containers specifically for surplus and scrap corrugated material. It is hoped Corropak will help increase the amount of recycled board to over 90% of production.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE INVENTION

Figure 1:
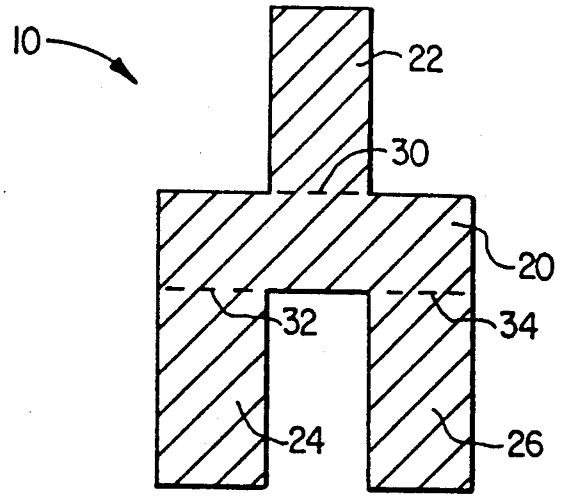
FIG. 1 is a flat view of the present void fill material.

The present invention relates to an improved packing material that overcomes many of the disadvantages found in the prior art. A void fill material 10 embodying the present invention is disclosed in FIG. 1. Void fill material 10 is comprised of a primary section 20 and, in a preferred embodiment, three appendages or "fingers" 22, 24, 26. Typically, a first finger 22 is attached to one side of primary section 20, while a second and third finger 24, 26 are located on the opposite side of primary section 20. The intersection of each finger 22, 24, 26 with primary section 20 can be scored to allow for bending of each finger away from the plane defined by primary section 20. The first, second, and third fingers can have a length to width ratio of between 3:1 and 1:1. Likewise, the primary section can have a length to width of between 3.25:1 and 1:1.

In a preferred embodiment, the first finger 22 can be 1 inch in length and ½ inch in width. The second and third fingers 24, 26 can be 1 inch in length by 9/16 inch in width. The primary section 20 can be 1⅝ inch in length and ½ inch in width. The second and third fingers 24, 26 are separated by a distance of ½ inch. Thus, the first finger 22 of one piece of packing material 10 can engage the area between the second and third fingers 24, 26 of an adjacent piece of packing material. Of course, the dimensions provided describe only one embodiment of the invention, and can be altered to suit an individual's needs. In an alternate embodiment, the packing material can comprise a primary section with only a second and third finger extending therefrom.

Figure 2:
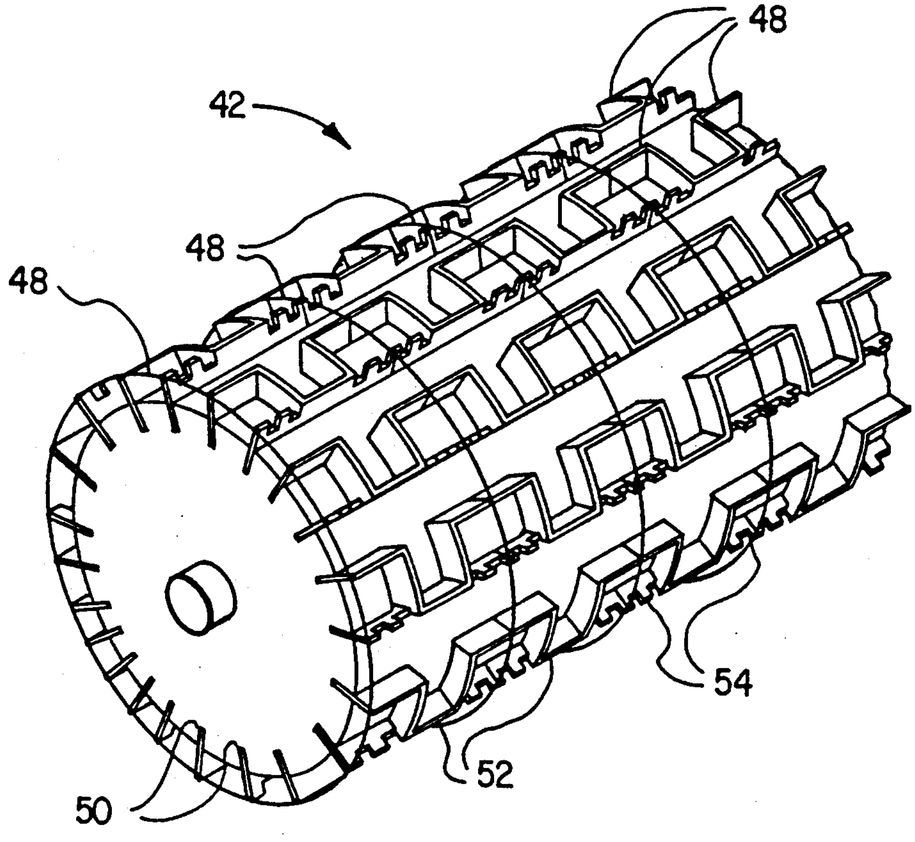
FIG. 2 is a detailed view of the cutting roller used to produce the present void fill material.
Figure 3:
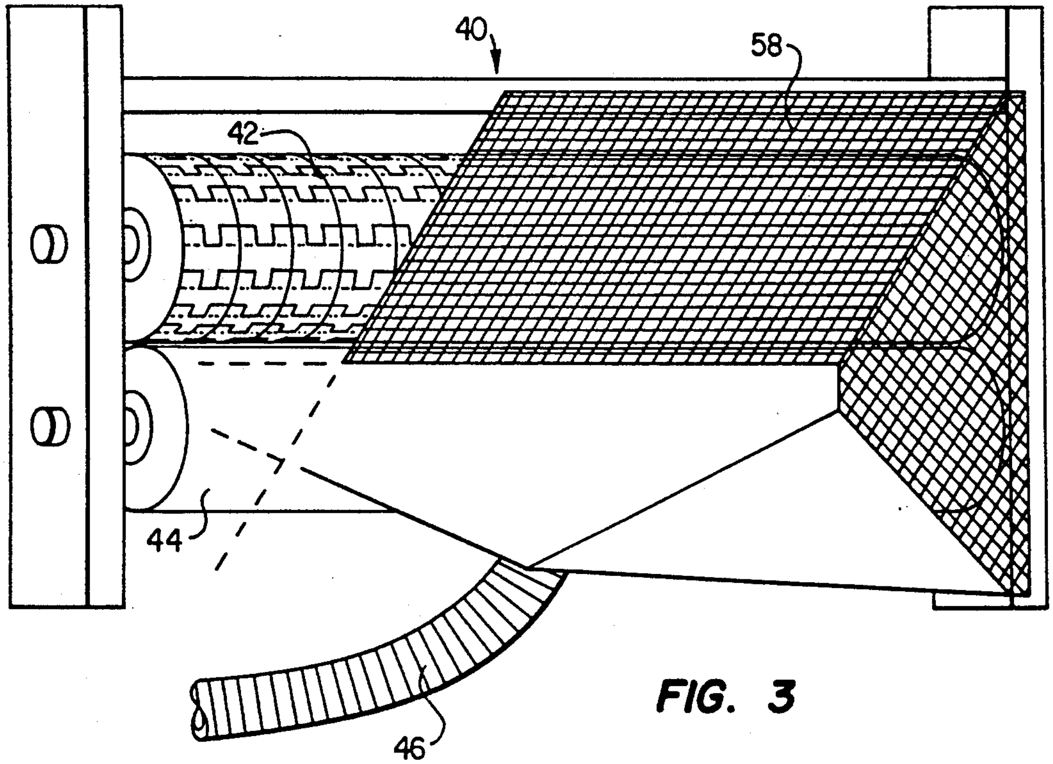
FIG. 3 is a diagram of the equipment used to produce and collect the present void fill material; and, FIG. 4 is a side view of the equipment used to produce and collect the present void fill material.
Figure 4:
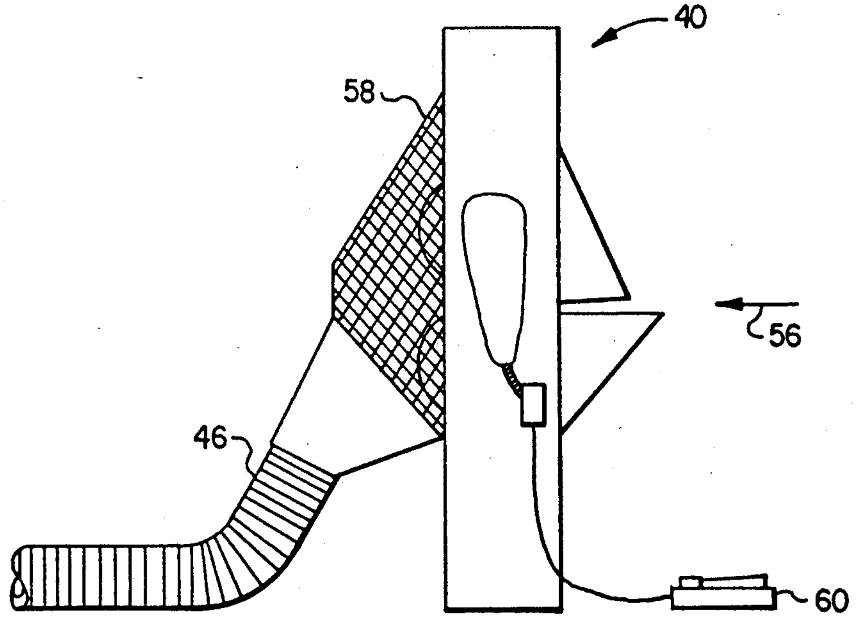

FIG. 2 is a detailed view of the cutting roller 42 used to produce the present void fill material 10. Referring to FIGS. 2, 3, and 4, the general design of the Corropak machine 40 is a machine that uses two large rollers, one being the cutter 42 and the other being the striking surface 44, turning in opposite directions. The corrugated is fed between these two rollers as shown be arrow 56. As it passes between the rollers, it is cut into the disclosed design. As it passes out of the rollers, it is drawn into the collection hoppers by a vacuum system 46. From there it is blown into the dispensing hoppers for use. Protective screening 58 is attached to the Corropak machine 40 to catch the cut packing material as it exits the rollers 42, 44. Each cutter 42 comprises a generally cylindrical roller with a plurality of cutting blades 48 removably attached thereto. Each blade 48 has a cutting edge 52 and a perforating edge 54. The blades 48 attach to the roller 42 by fitting into grooves 50. A foot pedal 60 can control the Corropak machine.

The unique design of the cutting roller uses a set of blades 48 to provide the necessary pressure to do the cutting. This blade pattern forms the void fill material design and also provides easy replacement of worn or damaged blades. There are several advantages of this design. A primary consideration is the ease of blade replacement. This reduces downtime and allows a company to change blades themselves. They may then send them to the distributor for sharpening or replacement. Another advantage is the economy of mass production. All machines will use the same blades. The difference is the width of the machine and rollers.

In a preferred embodiment, the diameter of the rollers is 11.45 inches. Each revolution will produce over 800 pieces of void fill material. At the preferred speed of one second per revolution, a 36 inch machine will produce over 40,000 pieces per minute. No waste is produced in the conversion process.

In addition to the rollers, other pieces of equipment can be added. For example, a metal detector could be added to detect metal staples before they damage the cutting blades. The detector would shut down the Corropak machine when a staple or other piece of metal is found. Additionally, a box splitter can be used for taking a taped box and breaking it down into a flat piece of corrugated that will feed through the machine.

FIGS. 3 and 4 are diagrams of the equipment used to produce and collect the present void fill material 10. A blower may be used for blowing the Corropak through the ducting and into the hoppers. This allows the Corropak to be "poured" through the same equipment as other void fills. A hopper is a large bag suspended from the ceiling which stores void fill. Hoppers have a scissor closure which allows the void fill to be poured into the containers being packed. Recycling bins for collection and storage of surplus corrugated board may also be utilized. Last, bagging equipment may be used for bagging the present void fill material for resale or distribution. Small users can then purchase bagged Corropak for use.

In summary, as the trend continues away from plastic packaging, corrugated material and paper products will continue to be in greater demand. Products that allow reuse of existing corrugated board without requiring additional manufacture will provide a great benefit to the economy and the environment.

In 1990, production capacity of U.S. mills was seventy-seven million short tons paper and paperboard. Of this, twenty-four million short tons (approximately 31%) was containerboard. Unfortunately, only twenty-one million short tons of all types of wastepaper was recycled. This is only 30% of all paper produced domestically last year. This equates to fifty-six million short tons of paper and paperboard being discarded in 1990. Of the twenty-four million tons of containerboard produced, approximately 30% was recycled. This means that over sixteen million short tons of containerboard became scrap. With Corropak weighing approximately 3.45 pounds per cubic foot, one ton of waste corrugated board will produce 580 cubic feet of the present void fill material. Thus, the sixteen million tons of surplus corrugated would convert to over nine billion cubic feet of Corropak.

In comparison, polystyrene void fill usage was approximately two and one half billion cubic feet in 1990. This allows the void fill market demand to increase four-fold without a shortage of corrugated packaging materials. Thus, the present void fill material is a direct solution to the excess corrugated materials problem and the elimination of polystyrene void fill. Corropak will extend the useful life of existing corrugated material by several months or years. Corropak can be reused many times over. When the Corropak is worn out, it can be gathered and recycled into new containerboard.

Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the invention.

I claim:

1. A void fill material for use within a container around a product comprising:

(a) a primary section defining a primary plane;

(b) a first finger extending from one side of the primary section;

(c) a second and third finger extending from the opposite side of the primary section from the first finger; and, wherein the void fill material is made of a corrugated material.

2. The void fill material of claim 1 wherein said first, second and third fingers are capable of being deflected away from said primary plane.

3. The void material of claim 1 wherein said corrugated material material is comprised of corrugated cardboard.

4. The void fill material of claim 1 wherein said corrugated material is comprised of chipboard.

5. The void fill material of claim 1 wherein said first finger has a length to width ratio of between 3:1 and 1:1.

6. The void fill material of claim 1 wherein said second and third fingers have a length to width ratio of between 3:1 and 1:1.

7. The void fill material of claim 1 wherein said primary section has a length to width ratio of between 3.25:1 and 1:1.

8. The void fill material of claim 1 wherein the intersection between the primary section and at least one of the fingers is scored.

9. The void fill material of claim 1 wherein the first, second and third fingers are designed to interlock with similar structures on adjacent pieces of void fill material.

10. The void fill material of claim 9 wherein said fingers are deflected from said primary plane.

11. A void fill material cut from corrugated materials for use within a container around a product comprising:

(a) a primary section defining a primary plane;

(b) at least two fingers extending from said primary section, said fingers dimensioned to interlock with fingers on an adjacent piece of void fill material.

12. A void fill material for use within a container around a product comprising:

(a) a primary section defining a primary plane;

(b) a first finger extending from one side of the primary section;

(c) a second and third finger extending from the opposite side of the primary section from the first finger; and wherein at least one of said fingers is scored at the intersection of that finger and the primary section allowing said at least one said fingers to deflect from the primary plane.

13. The void fill material of claim 12 wherein said material is comprised of corrugated board.

* * * * *